United States Patent [19]

Mogilevsky

[11] Patent Number: 5,649,222

[45] Date of Patent: Jul. 15, 1997

[54] METHOD FOR BACKGROUND SPELL CHECKING A WORD PROCESSING DOCUMENT

[75] Inventor: Alex Mogilevsky, Redmond, Wash.

[73] Assignee: Microsoft Corporation, Redmond, Wash.

[21] Appl. No.: 437,949

[22] Filed: May 8, 1995

[51] Int. Cl.$^6$ ................................................. G06F 17/00
[52] U.S. Cl. ................................................. 395/795
[58] Field of Search ..................................... 395/795, 794, 395/803, 793, 792, 761, 778, 788, 326, 352, 353

[56] References Cited

U.S. PATENT DOCUMENTS

| | | |
|---|---|---|
| 4,136,395 | 1/1979 | Kolpeck et al. ................. 395/795 |
| 4,651,300 | 3/1987 | Suzuki et al. ................... 395/795 |
| 4,689,768 | 8/1987 | Heard et al. .................... 395/795 |
| 4,980,855 | 12/1990 | Kojima .......................... 395/795 |
| 5,392,386 | 2/1995 | Chalas ........................ 395/353 X |

*Primary Examiner*—Almis R. Jankus
*Attorney, Agent, or Firm*—Klarquist Sparkman Campbell Leigh & Whinston

[57] ABSTRACT

A method for checking spelling in a word processor integrates spell checking with the editing process. During idle periods of the word processor, the spell checker scans an open document, and maintains a table of spelling status data, including codes to identify checked, unchecked, or edited ranges of characters. Spelling errors can be highlighted during an editing session. Spelling status data is maintained with the document so that spell checked portions of the document do not need to be re-checked.

24 Claims, 4 Drawing Sheets

METHOD FOR BACKGROUND SPELL CHECKING A WORD PROCESSING DOCUMENT

The invention relates to word processing, and more specifically relates to a spell checking feature in a word processing system.

BACKGROUND OF THE INVENTION

Many word processing applications include a spell checking feature to help find spelling errors in a document. In these word processors, the user typically invokes a spell checker by selecting a spelling tool option. Typical spelling tools enable the user to choose whether a word, page or an entire document is to be checked. To check an entire document, the spelling tool then scans the document, checking every word to identify potentially misspelled words. For every potentially misspelled word, the spelling tool may prompt the user to replace, ignore, or edit the word. Typically the spell checker provides a variety of alternative spellings to choose from. This process continues until the user either expressly exits the spelling tool or the spelling tool finishes checking the document.

Spell checking according to the process outlined above is inefficient for several reasons. It is an inefficient use of processing resources because an entire scan of the document is completely re-executed every time a user invokes it. When the user initiates spell checking, the spelling tool always begins from scratch, even if portions of the document have already been checked. As a result, spell checking takes more processing time than if prior spell checking results had been stored and re-used.

In addition to consuming more processing time, spell checking also takes longer for the user to complete. The user has to initiate the spelling tool by entering a specific command. Every time the user wants to check spelling, he or she has to stop editing the document and then separately invoke the spelling tool. Once started, the user is prompted for input for every potentially misspelled word from start to finish. Even to check a single word, the user has to separately invoke the spell checker and then return to the editing process. Even for modestly sized documents, spell checking can take quite a long time when executed in this manner.

Thus, while spell checking is a helpful feature, it is not efficient in terms of processor time and required user interaction.

SUMMARY OF THE INVENTION

To address the problems and drawbacks of existing spell checkers, the invention provides a method for performing spell checking in the background. "Background spell checking" generally refers to spell checking a document during idle periods when the word processor is in edit mode.

In one embodiment of the invention, a method for background spell checking is incorporated into a word processor. During idle periods, i.e. when the user is not typing or no commands are being executed, the spell checker automatically spell checks the document. The spell checker stores status codes in a table identifying whether ranges of a characters have been checked or not, whether there are spelling errors, and whether a range of characters has been recently edited. This table allows the spell checker to keep track of the spelling status of the document. The table also tracks changes to the document that affect the spelling status. For example, if a user edits a document by adding text at the middle of a sentence, the spell checker notes the range of characters affected by the edit and then re-checks the words in this range.

The invention provides a number of advantages relative to existing spell checkers. Spell checking is much easier for the user because it occurs automatically. The user does not have to specifically invoke a spell checker to locate errors. Rather, the background speller can automatically highlight spelling errors as they are detected in the background. The user can then correct the error or come back to it later. Spelling errors that the user would otherwise repeat can be corrected sooner.

Also, since spelling information is stored with a document, the spell checker only has to check edited or unchecked portions of the document. The background speller makes efficient use of processor time by performing spell checking during idle periods and saving the results. If the user wishes to specifically invoke the spelling tool, the spelling tool has less work to do because it simply uses the saved spelling status information. Thus, background spell checking uses processor time more efficiently.

Further advantages and features will become apparent with reference to the following detailed description and accompanying drawings.

DETAILED DESCRIPTION

The following description begins by explaining the elements of a computer system in which a method and system according to one embodiment of the invention is implemented. The description then provides an overview of a word processing system with background spell checking. Next, the description provides additional detail explaining the operation of the embodiment and how to implement it.

Figure 1:
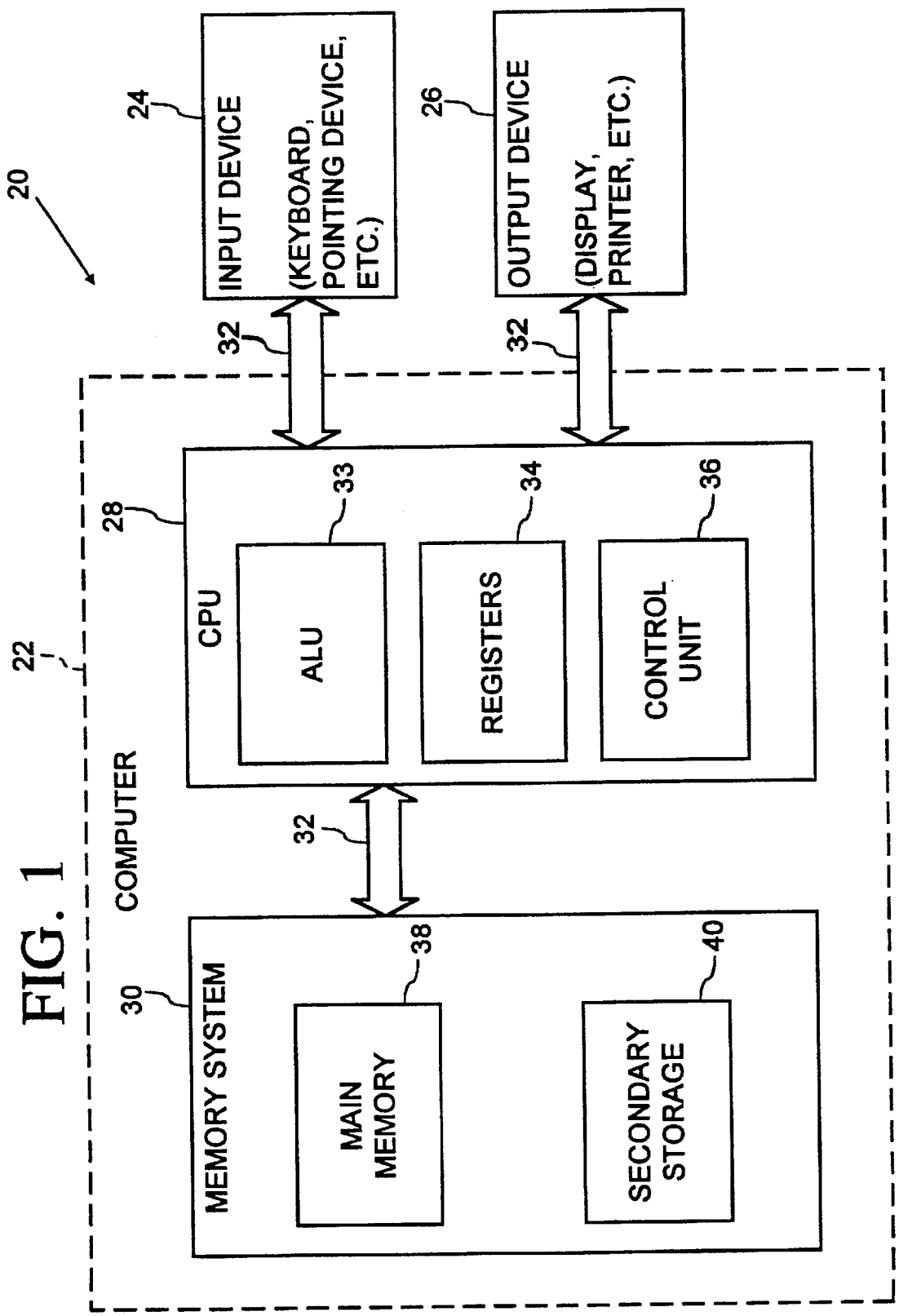
FIG. 1 is a block diagram of a computer system which is used to implement a method and system embodying the invention.

FIG. 1 is a block diagram of a computer system 20 which is used to implement a method and system embodying the invention. Computer system 20 includes as its basic elements a computer 22, input device 24 and output device 26.

Computer 22 generally includes a central processing unit (CPU) 28 and a memory system 30 that communicate through a bus structure 32. CPU 28 includes an arithmetic logic unit (ALU) 33 for performing computations, registers 34 for temporary storage of data and instructions and a control unit 36 for controlling the operation of computer system 20 in response to instructions from a computer program such as an application or an operating system.

Memory system 30 generally includes high-speed main memory 38 in the form of a medium such as random access memory (RAM) and read only memory (ROM) semiconductor devices and secondary storage 40 in the form of a medium such as floppy disks, hard disks, tape, CD-ROM, etc. and other devices that use optical, magnetic or other recording material. Main memory 38 stores programs such as a computer's operating system and currently running application programs. Main memory 38 also includes video display memory for displaying images through a display device.

Input device 24 and output device 26 are typically peripheral devices connected by bus structure 32 to computer 22. Input device 24 may be a keyboard, modem, pointing device, pen, or other device for providing input data to the computer. Output device 26 may be a display device, modem, printer, sound device or other device for providing output data from the computer.

It should be understood that FIG. 1 is a block diagram illustrating the basic elements of a computer system; the figure is not intended to illustrate a specific architecture for a computer system 20. For example, no particular bus structure is shown because various bus structures known in the field of computer design may be used to interconnect the elements of the computer system in a number of ways, as desired. CPU 28 may be comprised of a discrete ALU 33, registers 34 and control unit 36 or may be a single device in which one or more of these parts of the CPU are integrated together, such as in a microprocessor. Moreover, the number and arrangement of the elements of the computer system may be varied from what is shown and described in ways known in the art.

The invention may be implemented in any of a number of well-known computer systems. For instance, the invention may be implemented in a personal computer (PC), such as IBM-AT compatible computers or computer systems based on the 80386, 80486, or Pentium processors from Intel Corporation. As another example, the invention may be implemented in an Apple Macintosh computer from Apple Computer. The Macintosh computer system is based on the MC68000 family of processors from Motorola Corporation. Alternatively, the invention may be implemented on any number of computer workstations, including computers based on a RISC (reduced instruction set computing) architecture. The above systems serve as examples only and should not be construed as limiting the type of computer system in which the invention may be implemented.

An operating system, loaded into memory of the computer system, provides a number of low level functions to support the operation of an embodiment of the invention. In general, the operating system is responsible for controlling the allocation and usage of a hardware resources such as memory, CPU time, disk space, and peripheral devices. As is well-known, operating systems provide such low level functions as module (process and dynamic link library) management, scheduling, interprocess messaging, memory management, file system management, and graphical user interface support.

A number of well-known operating systems are available for the computers listed above. For instance, the Microsoft DOS and Windows operating systems are widely used for computer systems based on the X86 family of processors from Intel Corporation. As another example, the Windows NT operating system can be used with computer systems based on the X86 family of Intel processors as well as RISC machines. As yet another example, the UNIX operating system and variations of it are widely used on a variety of computer systems.

Background spell checking, in this embodiment, is implemented in Microsoft Word, version 7, from Microsoft Corporation. Microsoft Word is a word processing application that runs in a windowing environment, namely the windowing environment of the Windows Operating System. While an embodiment of the invention is described in the context of Word, the invention can be implemented in a variety of word processor or text processing applications.

Figure 2:
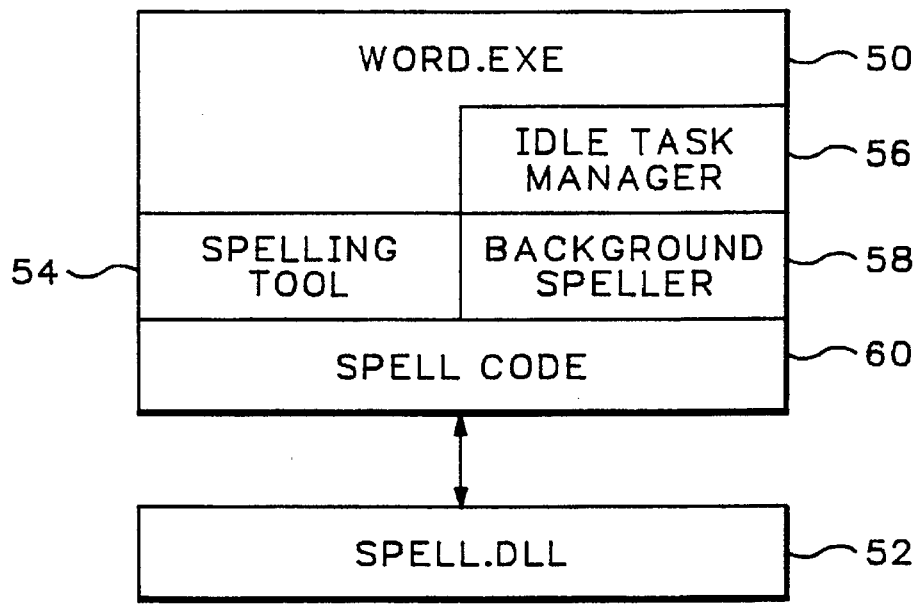
FIG. 2 is a block diagram illustrating the architecture of a word processing system according to an embodiment of the invention.

FIG. 2 illustrates the elements related to spell checking in Microsoft Word. Part of the code related to spelling resides in the executable file named, "Word.exe." 50 and another part in a dynamic linked library named, "Spell.DLL" 52. The spelling tool 54 in word.exe is a spell checking feature specifically invoked by the user. In contrast to background spell checking, the user has to initiate the spelling tool by entering a command to specifically invoke it. Background spelling does not replace the standard spell checking features. Rather, it complements the existing spelling tool and provides improved performance and functionality.

The idle task manager 56 in word.exe manages tasks performed in the background. "Background" in this context means that the word processor is idle. Idle periods include when the user is not typing, or when no other commands are being executed. Tasks performed in the background include printing, display renew, and background spell checking, to name a few.

The background speller 58 in word.exe controls spell checking during idle periods of the word processor. Unlike the spelling tool, the background speller 58 does not cause misspellings to be reported when found. Rather, the background speller keeps track of spelling status data including location of misspellings in an internal table generated while scanning the document in the background. The spelling status data can be stored in the document or can be stored separately.

The user can select whether to have misspellings found with the background speller highlighted. If a misspelling appears in a document in the portion visible to the user, the misspelling is highlighted. However, the user can opt to have the highlighting feature turned off. The operation of these and other aspects of the background speller is described in further detail below.

Referring again to FIG. 2, the spell core 60 in word.exe provides spelling services to both the spelling tool 54 and to the background speller 58. Both the spelling tool 54 and the background speller 58 make function calls to the spelling core 60 to scan a document. The calling routine specifies a range of characters in a document. For the spelling tool, the range typically spans the entire document from beginning to end, or alternatively, from the insertion point to the end of the document, and then from the beginning to the insertion point. For the background speller, the range follows according a priority scheme described further below.

Given this range of characters, the spelling core identifies complete words, and passes them to spell.dll for verification. Spelling core analyzes transitions between types of characters to identify a complete word. For each word identified, spell core passes the word to spell.dll for verification.

Spell.dll 52 is responsible for checking the spelling of a word passed to it. Given a word for verification, spell.dll can return a variety of status codes including but not limited to: "no errors," "unknown word," or "abbreviation." After receiving a status code from spell.dll, the Word performs additional analyses such as checking for repeated words. Upon request, spell.dll generates a list of suggested replacements for a misspelled word.

Having described the primary elements of Word relating to spell checking, it is now appropriate to describe background spell checking in further detail.

Figure 3:
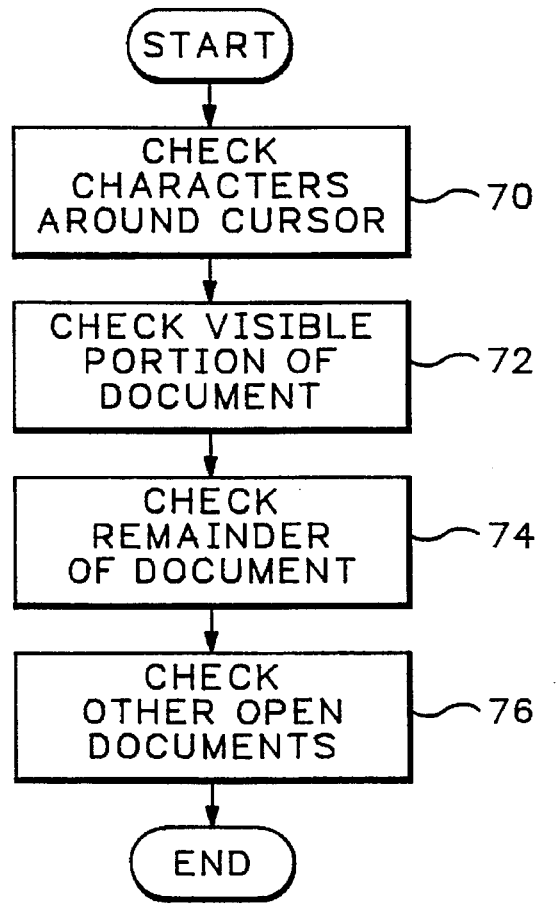
FIG. 3 is a flow diagram illustrating how the background speller prioritizes spell checking in an embodiment of the invention.

FIG. 3 is a flow diagram illustrating how the background speller prioritizes spell checking in Word. It is preferable to display misspellings visible to the user first. Since the user can only view the portion of the document on the display screen, the background speller checks the visible portion of the document first, and then checks the rest of the document. The background speller begins spell checking according to the priority scheme outlined in FIG. 3 during idle periods of the word processor.

In this implementation, the background speller checks 6 words at a time when it is scheduled to run by the idle task manager. If another command occurs while the background speller is checking these 6 words, Word will not preempt the background speller until it finishes checking them. When it has completed 6 words, the background speller continues if no other task within Word requires processing.

An example will help illustrate the operation of the background speller. After a key is pressed, an idle period begins and the idle task manager invokes the background speller. If the user presses another key after four words are scanned, the background speller continues without interruption until 6 words are scanned. Then, Word processes the input from the key. After each group of six words scanned, the background speller checks whether there is reason not to continue scanning the next 6 words. If not, the background speller continues to scan 6 words at a time. The constant value of 6 words is based on performance testing and can be changed easily without substantial modification of the background speller.

The ability of the background speller to spell check while keeping pace with the typist depends on processor speed, typing speed, and the efficiency of the routine spell checking each word. To obtain better performance, it is preferable to use a computer system having a Pentium processor from Intel Corp. However, the concepts of the invention can be implemented using a variety of different processors and spell checking routines.

The background speller makes calls to spell.dll to spell check a document according to the priority outlined in FIG. 3. Beginning with step 70, the background speller checks 30 characters before and after the insertion point, if no text is selected. In this case, the insertion point is displayed as a blinking cursor. If text is selected, the background speller checks the range beginning 30 characters before the beginning of the selected text and ending 30 characters after the end of the selected text. Selected text is typically depicted as an inverted display, e.g. the background changes from white to black while the text changes from black to white. The range of 30 characters was chosen to be large enough to include a few average sized words, yet small enough to check quickly. This range can be longer or shorter to achieve the desired performance.

The background speller calls spell core and requests a scan for the ranges specified above: either 30 characters before and after the cursor or the selection. While checking words in the specified range, the background speller ignores the word currently being typed so that it is not considered to be misspelled before the user completes typing it. To implement this feature, the background speller delays checking the current word using a technique described further below.

In the next step 72, the background speller checks the remaining portion of the visible screen. Word keeps track of the first visible character on the display. In checking the visible screen, the background speller begins with the first visible character and continues scanning from this character. This scan typically includes the range of characters checked in step 70, but there is no need to re-check ranges of characters that have already been checked and have not been edited. As described in further detail below, the background speller keeps track of the spelling status of the document and skips ranges of characters that have already been checked.

Starting from the first character of the visible screen, the background speller continues scanning until the end of the document. The background speller then starts scanning from the beginning of the document. Thus, after checking the text in the visible screen, the background speller checks the remainder of the document as shown in step 74.

Finally, if any other documents are open, the background speller will check them if they have been modified during the current session as shown in step 76. If a document has not been modified, it is not checked. The same applies to the current document. Thus, if the user only opens a document to read or print it, it is not checked.

The background speller performs spell checking according to the priority scheme described in FIG. 3 without prompting from the user. In other words, the background speller automatically checks a document, and potentially other open documents, without requiring the user to specifically discontinue editing a document and invoke the spelling tool. While spell checking in the background, the background speller does not interrupt the user by reporting errors in a manner that requires user input. Instead of pausing to report spelling errors, the spell core maintains a table to track spelling status.

The table for maintaining spelling status data is implemented using a dynamic array. Cells in the array include a character position to identify a range of characters, a spelling code to represent spelling status for the range of characters, and a time stamp. The character position is an integer corresponding to the number of a character in a document. For example, the character position of the first character in a document is zero, the second character is one, and so on. The cells in the table list the character position of the first character in a range of characters having the same spelling status. The table, thus, only stores status codes corresponding to character positions where the spelling status changes.

As an alternative to a dynamic array, spelling state data can also be stored as text attributes. In this alternative case, spelling state codes are stored similarly to character formatting such as font, character size, or bold attributes in the document. This alternative is less effective because it is more difficult to update the spelling state codes and search for them in the document.

Storing spelling state data in a dynamic array is a preferred implementation because it supports efficient searching and facilitates updates of spelling state data.

Regardless of the specific method for storing spelling state data, a preferred implementation supports the following functions. First, it can associate spelling states with a range of characters. Second, it can find the spelling state for a given character. And third, it can effectively search for a next or previous character range with a different spelling state, beginning from a specified location in the document. The dynamic array described here supports these functions.

During a session, spelling state data is stored in memory. The spelling state data can also be stored in a file in secondary storage between sessions. The spelling state data can be stored in the document file or in a separate file. By storing the spelling data between sessions, it can be re-used in another session.

Referring again to the spelling table, the time stamp is a value that helps synchronize a document with the state of a custom dictionary. If a word is added to a custom dictionary, all misspellings in all open documents have to be rechecked because some may have become correctly spelled words. In this implementation, the time stamp is an integer equal to the number of changes made to a custom dictionary during a session.

There are a number of spelling codes to represent the spelling status of ranges of characters in a document. A range of characters can include as little as one character and as many as the number of characters in an entire document. One spelling code indicates that a range of characters is "clean" (correctly spelled). Another status code indicates that a range of characters contains an error (incorrectly spelled word or words). Yet another status code indicates that a range of characters is "dirty" (not checked).

In addition to these codes, there are additional codes used for special cases. An "edit" code marks a section of text that has been recently edited by the user. The edit code indicates that the range of characters associated with it, as well as some adjacent text, must be re-checked. A "foreign" code indicates a text in a language for which there is no dictionary available. The background speller treats the text marked foreign as being correctly spelled, but it is re-checked if the document is opened when the appropriate foreign dictionary is available.

Figure 4:
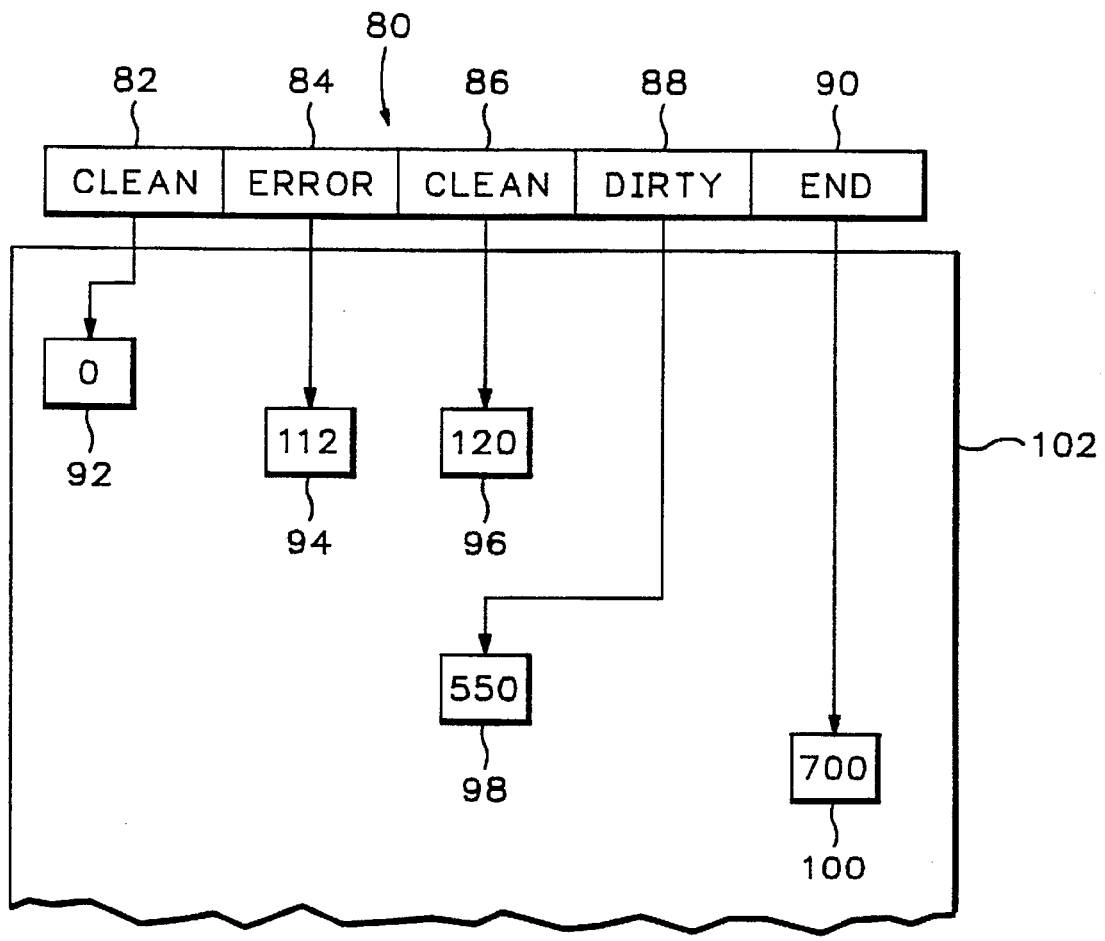
FIG. 4 is an example illustrating how a spelling table represents the spelling state of a document according to an embodiment of the invention.

FIG. 4 is an example illustrating how a table represents the spelling status of a document. The table 80 is depicted as a series of consecutive cells 82–90, each including a status code flag and a character position 92–100 in a document 102. FIG. 4 graphically illustrates how cells in a table 80 map to positions in a document 102, but the character position associated with each cell refers to position by an integer identifying the number of the character in document, rather than actually pointing to a location in the document.

The first cell 82 indicates that a range of correctly spelled words begins at character position 0. Since there are no flags until character position 112, the document is clean in the range from character position 0 to 111. The error flag in cell 84 indicates that there is a potential spelling error starting with character position 112. The next cell 86 indicates the character range starting at position 120 are correctly spelled. The range of correctly spelled words continues until position 550, represented in the next cell 88. This cell 88 represents the beginning of a range of characters that need to be checked. The final cell 90 indicates that the end of the document is at character position 700. Thus, the range from position 550 to the end of the document remains to be checked in this example.

If a misspelled word is detected during a background spell check, it is represented with the error flag and also may be represented with a highlight flag as well. Used to highlight misspellings, the highlight flag is always cleared for ranges of characters marked with the clean flag, and is always set for ranges of characters marked with the error flag. Text in other states, namely the edit state, can have the highlight flag set or cleared depending on the editing history of the characters.

When the user has opted to have misspelled words highlighted, i.e. the user has not turned the feature off, misspelled words are highlighted while visible to the user. If the user turns the feature off, the highlight flag is still set, but the display code ignores this property of the misspelled text. The background speller causes a misspelled word to be highlighted if the highlight flag is set, and the misspelled word is in a portion of the document shown on the display screen.

When the highlight flag is set, the display code treats the highlight flag as a property of the text, similar to underlined or bold text. In this implementation, the text is displayed in red and underlined with a red wavy line. However, a variety of other display properties can be used to highlight a misspelling.

An important aspect of the background speller is its ability to track document changes. When a user edits a document, the spelling status of the edited characters, and possibly surrounding characters can be affected. For example, concatenation of two correctly spelled words usually produces an incorrectly spelled word, unless a space is inserted in between them.

Figure 5:
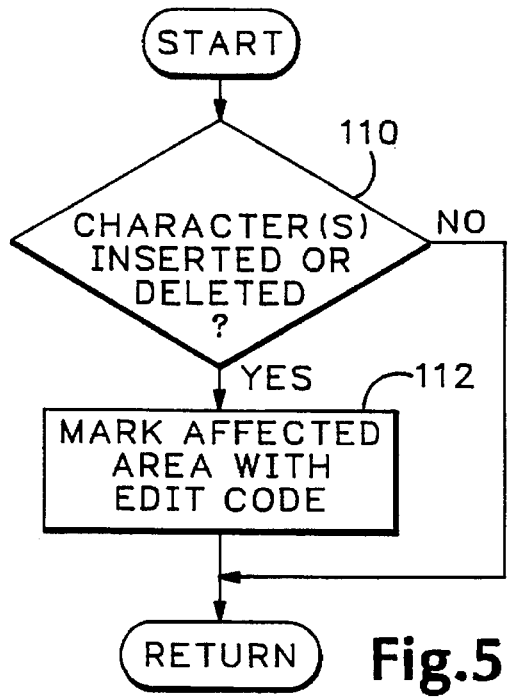
FIG. 5 is a flow diagram illustrating the steps for identifying recently edited text in the spelling table according to an embodiment of the invention.
Figure 6:
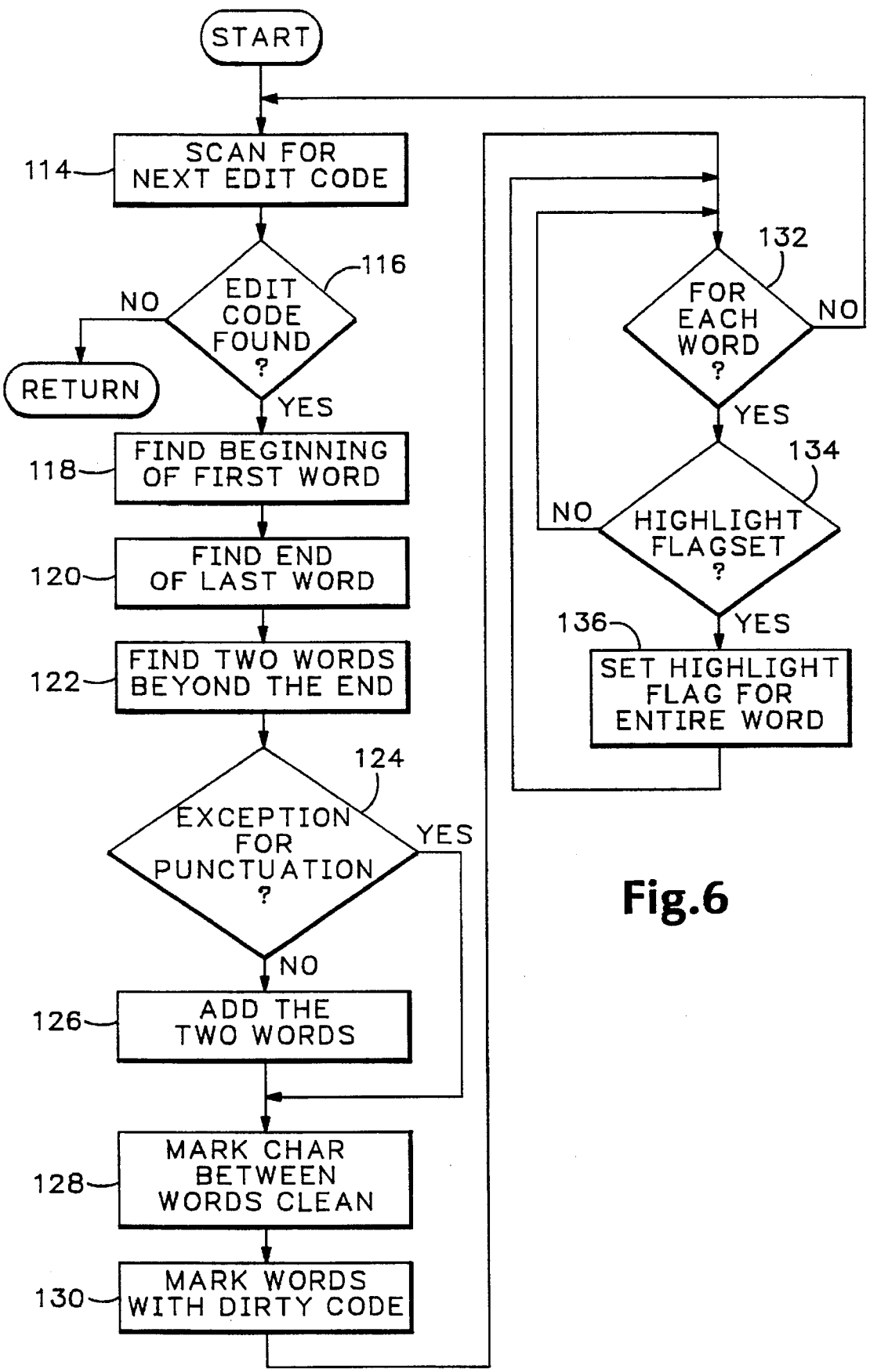
FIG. 6 is a flow diagram illustrating the steps for updating the spelling state of recently edited text according to an embodiment of the invention.

FIGS. 5 and 6 illustrate how Word detects changes in a document and updates the spelling table so that affected text can be spell checked. FIG. 5 represents the process of setting an edit code in the table when text is modified, and FIG. 6 represents the process of changing the edit code to a not checked or "dirty" code so that the modified text can be thoroughly spell checked.

To keep track of changes to the document, the routine responsible for making a change to the document edit is also responsible for updating the spelling table. Edit actions involve calling a specific edit routine to perform the edit. In Word, these edit routines also adjust dynamic arrays, like the spelling table, that correlate an attribute such as a spelling status code with a character position.

When one or more characters are inserted or deleted as shown in decision step 110, the edit routine also causes the edit code to be set in the spelling table. In the next step 112, the edit routine marks the affected area of the document by setting the edit code for a character position corresponding to the beginning of the affected range of characters. In the case where text is only deleted, the edit routine adds an edit code with a range of zero width to the table. When new text is inserted, including the case where old text is deleted and then replaced, the edit code has a range extending across the newly added characters.

Before continuing spell checking in the idle periods, the background speller then executes a routine to process edited text. FIG. 6 illustrates this routine. In a first step 114, this routine scans the spelling table for edit codes. For each edit code, the routine proceeds to process the edit codes as reflected by the steps following decision step 116.

First, the beginning and end of the range are identified. In the next two steps 118, 120, the range of the edit is determined in terms of the beginning of the first word and the end of the last word affected by the recent edit. In step 118, the first character of the word at the beginning of the edit range is determined. Extending the range to the first character of this word ensures that errors caused by concatenating two words will be detected. In step 120, the last character at the end of the edit range is determined. The range may need to be extended further at the end to check for repeated words as explained below.

If only one character is added as a result of the edit, the first and last character of the word containing the added character is determined in these steps 118, 120. Similarly, if one or more characters are deleted, only the first and last character of the word at the location of the deletion is found. For example, this word can be a new word formed by joining characters on each side of the deleted text.

Next, the two words following the last word in the edit range are found and added to the range of potentially affected text, unless they are separated by punctuation and a white space. This part of the process is represented by the next three steps 122, 124, 126 in FIG. 6. If the two words are separated by punctuation and a white space, then they cannot produce a repeated word error. Thus, there is no reason to include these words in the range of characters affected by the edit.

By extending two words forward, the routine ensures that exceptions to the rule for consecutively repeated words will be detected. One exception, for example, is "had had." This can be correct, but a third "had" makes it incorrect.

After identifying the appropriate range of characters, all characters between words are marked as clean and all words in the range are marked as dirty (not checked) as shown generally in steps 128, 130.

Next, each of the words in the range are checked for a highlight flag. The decision step 132 represents the beginning of a loop for checking each word for a highlight flag. Each word is checked to determine whether characters comprising the word are marked with the highlight flag as shown in step 134. If so, the entire word is marked with the highlight flag as shown in step 136. If not, the loop continues with the next word in the range. The process of assigning highlight flags ends after each of the words in the range is checked for a highlight flag.

After processing an edit range, the routine then continues its scan for the next edit range. For each edit range detected, the edit range is processed as outlined above. This process can be modified without departing from the scope of the invention. For example, steps can be rearranged or additional steps can be added to address special cases.

In this implementation, word boundaries are determined using a language dependent table of word delimiters. Whether a certain character acts as a delimiter can depend on the position of the character relative to a word. For example, a comma can be part of word if surrounded by characters, but it is not part of a word if it has a whitespace on one side. Similar rules apply to other types of punctuation. A variety of word-defining routines can be applied to define words from a string of characters.

After the edit ranges have been collected and converted according to FIG. 6, the background speller continues spell checking in the background. Following the priority scheme currently being edited. To avoid checking the word currently being typed, the background speller makes an exception for this word. If the insertion point is located in a word, and this word is not marked with the highlight flag, then this word is not spell checked.

This exception is implemented in the routine that collects edit ranges before initiating spell checking. When the routine is scanning for edit codes in the spelling table, it skips the edit range corresponding to the word at the insertion point. The current word will not be checked because the edit code corresponding to the word will not be changed to the dirty code while the cursor is in the word and highlight flag is not set.

Ultimately, the current word will be checked once the cursor moves somewhere else. For example, when the user types a space, the cursor moves beyond the current word. Also, if the user re-positions the cursor to another location in the document, the cursor will no longer be within the current word.

The exception for the current word does not apply when the word has already been found to be misspelled. If a user is editing a misspelled word, the background speller will re-check the word as often as possible. This can be as often as every character typed, but the idle time may not be sufficient to re-check it.

The exception for a misspelled word occurs if the highlight flag is set. A currently edited word is marked with the edit code as part of the editing routine as described above. During the process of scanning for the edit code, the word currently being edited will not be ignored if the highlight flag is set. Instead, it will be converted to the dirty code to indicate that the word should be checked.

An example will illustrate operation of the background speller. Assume that the document is the single sentence:

This cannt be bad.

Before background spell checking commences, the spelling table appears as Table 1 below. In addition, Table 1 shows the correlation between character position and the characters in the document. In its initial state, the entire document is not checked as reflected by the dirty code in character position 0 and the lack of other status codes.

TABLE 1

| DIRTY | END |
|-------|-----|
| 0     | 18  |

| T | h | i | s |   | c | a | n | n | t |    | b  | e  |    | b  | a  | d  | .  |
|---|---|---|---|---|---|---|---|---|---|----|----|----|----|----|----|----|----|
| 0 | 1 | 2 | 3 | 4 | 5 | 6 | 7 | 8 | 9 | 10 | 11 | 12 | 13 | 14 | 15 | 16 | 17 | 18 | of FIG. 3, the background speller looks for a range of characters having the dirty code set and passes the range to spell core for spell checking. Spell core is responsible for updating the status codes in the spelling table. This includes changing a dirty code to a clean code and setting the highlight flag where appropriate.

Spell core sets all spelling status codes after verifying the spelling of words with spell.dll and checking for repeated words. Spell core makes the final decision regarding the spelling state of text and setting highlight flags. All errors including unknown words and repeated words are set with the highlight flag, and all clean text, including foreign language portions, have the highlight flag turned off.

Spell core does not change the status of text marked with an edit code to support delayed spell checking of text Table 2 depicts the table after the first word, "This", is checked. The range from 0–3 is clean, and the range from 4–18 is dirty, indicating that it remains to be checked.

TABLE 2

| CLEAN | DIRTY | END |
|-------|-------|-----|
| 0     | 4     | 10  |

Table 3 depicts the table after the entire document is checked. The background speller detected an error in the word, "cannt", and the table reflects the error with the error code beginning at position 5 and extending through position 9. The character after the word, "cannt", and all of the remaining characters are marked clean.

TABLE 3

| CLEAN | ERROR | CLEAN | END |
|-------|-------|-------|-----|
| 0     | 5     | 10    | 18  |

Now if the "t" in "cannt" were replaced with the letter "x", then the table would appear as shown below in Table 4. The edit routine changes the code for character position 9 from error to edit. The edit range will be enlarged and converted to dirty as described above.

TABLE 4

| CLEAN | ERROR | EDIT | CLEAN | END |
|-------|-------|------|-------|-----|
| 0     | 5     | 9    | 10    | 18  |

The background speller can significantly improve the performance of the spelling tool. When a user invokes the spelling tool, it uses the results of the background speller. The results of the background speller are saved and maintained with the document in the spelling table. Since the areas marked clean in the table are not re-checked, misspellings can be found much faster.

The use of the spelling table can be used effectively in a number of other spelling features. For example, it can support rapid re-checking of a document when the user selects an option to ignore misspellings in certain types of words. If the user selects an option to ignore words in uppercase, the background speller re-checks currently misspelled words specified in the spelling table and changes the status of any misspelled upper case words. Because of the priority afforded to the visible portion of the document, the user will see any visible changes almost instantaneously.

If all of the text in a document must be re-checked, the spelling table can be reset. This causes the background speller to re-check the entire document.

In addition to the spelling tool that is commonly used to correct multiple spelling errors in a document, the background speller provides an alternative navigation tool. The spelling tool checks all of the text, starting from the cursor to the end of the document, and then continuing from the beginning of the document back the cursor. Next, the spelling tool checks subdocuments including headers, footers and annotations. As soon as an error is found, the user interface presents a dialog box to help the user fix the error.

The navigation tool provides the user an alternative method for viewing and correcting errors. The navigation tool checks up to 100 characters before the cursor and then moves forward. After moving backwards up to 100 characters, the navigation tool moves forward through the document like the spelling tool and uses the same routines to do so. Instead of displaying helpful spelling suggestions in the dialog box like the spelling tool, the navigational tool causes a spelling pop up menu to be displayed. This spelling pop up menu is also displayed when the user right-clicks the mouse while positioning the cursor over a highlighted misspelling.

The navigation tool begins with a short scan backwards to catch any recent misspellings. When an assigned hot key is pressed, or a special icon on the screen is clicked, the navigation tool first starts scanning the spelling array backwards. If a misspelling is discovered within 100 characters, or before the top of visible text is reached, whichever is closer, a pop up menu with suggestions is provided for that word.

After this brief scan backwards, the navigation tool continues scanning forward just like the spelling tool. While scanning the document, the navigational tool spell checks any range of characters not checked in the background. If a range of characters is discovered that has not been checked in the background, it is checked. In addition to searching the body of the document, the navigation tool also searches subdocuments (such as headers, footers, annotations, etc.) for spelling errors.

If the user wants to skip a misspelling, then the user dismisses the pop-up menu (by pressing the ESC key), and chooses the navigation key again. When the navigation tool finds a misspelling, it changes the misspelling to a selected state. For instance, the text is displayed in an inverted state to indicate that it is "selected." If the user dismisses the pop up menu, the misspelling remains in a selected state. When the user resumes navigation, the navigation tool notes that the misspelling is in a selected state and does not apply the reverse pass. Instead, it continues scanning for misspellings from the selected text forward.

While a background spell checking system has been described in detail with reference to an implementation in the Word word processing system, it should be understood that the invention can be modified without departing from the scope of the invention. For example, it is not critical that background spell checking be prioritized according to the scheme described above. The steps for updating and saving spelling state codes can be rearranged or modified without departing from the scope of the invention. The architecture of the system can also vary depending on the type of word processing application or other application.

In view of the many possible embodiments to which the principles of my invention may be put, it is emphasized that the detailed embodiment described herein is illustrative only and should not be taken as limiting the scope of my invention. Rather, I claim as my invention all such embodiments as may come within the scope and spirit of the following claims and equivalents thereto.

I claim:

1. A method for automatically checking spelling in a word processing document comprising the steps of:
   (a) storing spelling status data to monitor spelling status of ranges of characters in the word processing document;
   (b) automatically spell checking words in the word processing document during idle periods in editing the word processing document; and
   (c) if an edit to the word processing document changes one or more characters in the document, then updating the spelling status data corresponding to the one or more characters.

2. The method of claim 1 wherein step (a) includes storing spelling status codes in a table representing spelling status and corresponding character position data to identify a range of characters in the document associated with a spelling status code, and step (b) includes determining from the table a range of characters in the document to spell check automatically.

3. The method of claim 2 wherein the spelling status codes include a spell checked code indicating that a range of characters has been spell checked, and a not spell checked code indicating that a range of characters has not been spell checked.

4. The method of claim 3 wherein the spelling status codes include an edit code indicating a range of characters has been edited, and wherein step (c) includes:

in response to an edit action that inserts or deletes one or more characters in the document, updating the spelling status data corresponding to the one or more characters by changing the spelling status code associated with the spell checked section to the edit code;

scanning the table to identify a range of characters identified with the edit code, converting the edit code to the not spell checked code; and expanding a range of characters associated with the not spell checked code.

5. The method of claim 1 further including the step of changing a display state of a misspelled word in the word processing document, and displaying the misspelled word according to the display state.

6. The method of claim 1 further including the step of monitoring the position of an insertion point for characters in the word processing document to identify whether the insertion point is located within characters of a word; and if the insertion point is located within characters of the word, then delaying automatic spell checking of the word.

7. A method for automatically checking spelling in a word processing system including a programmed computer, a display device, and an input device, the method comprising the steps of:

managing idle processing time of the programmed computer while editing a word processing document;

during the idle processing time, performing spell checking of the word processing document; and storing spelling status data resulting from the spell checking step to keep track of the position of one or more spelling errors in the word processing document.

8. The method of claim 7 further comprising the step of updating the spelling status data for a range of character positions in response to edit actions that affect the range of characters.

9. The method of claim 7 wherein the storing step includes storing spelling status codes and corresponding character position data in a dynamic array.

10. The method of claim 9 further comprising the step of storing a spell checked code and corresponding character position data indicating a range of characters that has been spell checked.

11. The method of claim 9 further comprising the step of storing a not spell checked code and corresponding character position data indicating a range of characters that has not been spell checked.

12. The method of claim 9 further comprising the step of storing an edit code and corresponding character position data indicating a range of characters that has been edited.

13. The method of claim 9 further comprising the steps of storing a highlight flag and corresponding character position of the highlight flag indicating a range of characters of a misspelled word; and if the character position of the highlight flag is in a display screen of the display device, then highlighting the range of characters of the misspelled word.

14. The method of claim 7 wherein the step of performing spell checking includes performing spell checking according to a priority, the priority being:

checking characters currently displayed in a display screen of the display device first; and then checking characters not currently displayed in the display screen.

15. The method of claim 7 wherein the step of performing spell checking includes:

determining the position of an insertion point for characters in the word processing document;

if the insertion point is within a word, then delaying spell checking of the word.

16. The method of claim 7 wherein the step of storing includes storing spelling status data in a table including codes identifying ranges of characters that have been spell checked; and in response to a user request to check spelling errors in the document, scanning the table to determine which sections of the document have been spell checked.

17. The method of claim 7 wherein the step of storing includes storing spelling status data in a table for a first editing session, and further including the step of storing the table in a file in secondary storage along with the document so that the spelling status data can be re-used in a second editing session.

18. In a word processing system having a display device for displaying a word processing document, an input device for entering text into the document, and means for checking spelling of the document, a background spell checking system comprising:

an idle task manager for identifying idle processing period during an editing session; and a background speller in communication with the idle task manager for managing spell checking during an idle period, and for maintaining spelling status data for the document in a spelling status table.

19. The system of claim 18 wherein the background speller is in communication with a spelling status data store for storing the spelling status data including a spelling status codes and corresponding character position codes.

20. The system of claim 18 wherein the background speller is in communication with the display device for highlighting a misspelled word in the document on a display screen of the display device in response to detecting the misspelled word during the idle period.

21. A method for checking spelling of a word processing document in a word processing system including a programmed computer, a display device, and an input device, the method comprising the steps of:

performing spell checking of a first range of characters in the document during a first spell checking scan;

assigning spelling status data to the first range of characters in the document including a first spelling status code to indicate that the first range of characters has been spell checked, and a second spelling status code to indicate spelling errors in the first range of characters;

storing the spelling status data in memory; and spell checking a second range of characters in the document during a second spell checking scan, which includes checking the spelling status data to avoid rechecking characters in the first range of characters.

22. The method of claim 21 further including:

managing idle processing time of the programmed computer while editing a word processing document; and during the idle processing time, performing spell checking of the word processing document during the first or the second scan.

23. The method of claim 21 wherein the storing step includes storing the spelling status data in a spelling status table in memory.

24. The method of claim 21 wherein the storing step includes storing the spelling status data in the document.

* * * * *

UNITED STATES PATENT AND TRADEMARK OFFICE
CERTIFICATE OF CORRECTION

PATENT NO. : 5,649,222
DATED : July 15, 1997
INVENTOR(S) : Mogilevsky

It is certified that error appears in the above-indentified patent and that said Letters Patent is hereby corrected as shown below:

Column 10, line 60, " $\overline{\frac{END}{10}}$ " should read -- $\overline{\frac{END}{18}}$ --.

Signed and Sealed this

Twenty-eighth Day of July, 1998

Attest:

BRUCE LEHMAN

Attesting Officer

Commissioner of Patents and Trademarks